United States Patent
Micka et al.

(10) Patent No.: US 6,564,307 B1
(45) Date of Patent: May 13, 2003

(54) METHOD, SYSTEM, AND PROGRAM FOR LOGICALLY ERASING DATA

(75) Inventors: William Frank Micka, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,872

(22) Filed: Aug. 18, 1999

(51) Int. Cl.[7] ............................................. G06F 12/00
(52) U.S. Cl. ...................... 711/156; 711/103; 711/170
(58) Field of Search ............................ 711/103, 4, 112, 711/133, 134, 156, 159, 170; 713/156; 360/48; 365/230.01, 230.03, 218, 185.33, 185.02, 185.11

(56) References Cited

U.S. PATENT DOCUMENTS

| | | | |
|---|---|---|---|
| 3,769,469 A | 10/1973 | Garnier et al. ............... 360/118 |
| 4,287,540 A | 9/1981 | Cheatham et al. ............ 360/18 |
| 4,648,076 A | 3/1987 | Schrenk ...................... 365/189 |
| 4,691,350 A | 9/1987 | Kleijne et al. ............... 713/194 |
| 4,939,598 A * | 7/1990 | Kulakowski et al. .......... 360/48 |
| 4,947,367 A | 8/1990 | Chang et al. .................. 710/65 |
| 4,974,208 A | 11/1990 | Nakamura et al. .......... 365/228 |
| 4,975,878 A | 12/1990 | Boddu et al. ................ 365/189 |
| 5,086,413 A * | 2/1992 | Tsuboi et al. .......... 365/230.01 |
| 5,132,853 A * | 7/1992 | Kulakowski et al. .......... 360/48 |
| 5,193,184 A * | 3/1993 | Belsan et al. ................... 711/4 |
| 5,406,529 A * | 4/1995 | Asano ................... 365/230.03 |
| 5,412,717 A | 5/1995 | Fischer et al. .............. 713/156 |
| 5,457,658 A * | 10/1995 | Nijima et al. ............... 365/218 |
| 5,491,809 A | 2/1996 | Coffman et al. ............. 711/103 |
| 5,555,371 A * | 9/1996 | Duyanovich et al. ......... 714/13 |
| 5,598,370 A * | 1/1997 | Nijima et al. ........... 365/185.33 |
| 5,671,410 A | 9/1997 | Mizuno et al. .............. 707/104 |
| 5,715,193 A * | 2/1998 | Norman ................. 365/185.02 |
| 5,838,614 A * | 11/1998 | Estakhri et al. ........ 365/185.11 |
| 5,907,856 A * | 5/1999 | Estakhri et al. ............. 711/103 |
| 5,963,473 A * | 10/1999 | Norman ................. 365/185.02 |
| 5,968,182 A * | 10/1999 | Chen et al. ..................... 714/5 |
| 6,034,897 A * | 3/2000 | Estakhri et al. ........ 365/185.33 |
| 6,128,695 A * | 10/2000 | Estakhri et al. ............. 711/103 |
| 6,134,151 A * | 10/2000 | Estakhri et al. ........ 365/185.33 |
| 6,145,051 A * | 11/2000 | Estakhri et al. ............. 711/103 |

OTHER PUBLICATIONS

U.S. application Ser. No. 09/347,344, filed Jul. 2, 1999, entitled "Method, System, and Program for Maintaining Electronic Data as of a Point–In–Time".

* cited by examiner

*Primary Examiner*—David Hudspeth
*Assistant Examiner*—Fred F. Tzeng
(74) *Attorney, Agent, or Firm*—David W. Victor; Konrad Raynes Victor & Mann LLP

(57) ABSTRACT

Disclosed is a method, system, program, and memory for erasing data. A request to erase data at least one storage location is received. In response, a data structure is generated indicating that each storage location subject to the erase request is in an erased state. Upon processing a request to access a storage location, a determination is made as to whether the requested storage location is indicated in the data structure. The data structure is processed to determine whether the requested storage location is in the erased state after determining that the requested storage location is indicated in the data structure. Access to the data at the requested storage location is denied after determining that the requested storage location is in the erased state.

35 Claims, 7 Drawing Sheets

| Field Name | Description of Field |
|---|---|
| Number of Extent Pairs | Indicates the number of extent pairs in the table. |
| Target/Source Device Address | Identifies the logical address of the corresponding target or source device; for a logical erase is set to the erase code. |
| Source Start | Contains the CCHH for the first source track in the extent. |
| Source End | Contains CCHH of last track in extent. |
| Number of tracks | Binary count of tracks from source start location. |
| Target Start | Contains the CCHH for the first target track in the extent. |
| Target End | Contains CCHH of last target track in extent. |
| Tracks to Erase | Contains the number of tracks for each extent that have not been physically erased that are logically erased. |
| Sequence Number | A sequence number or time value. |

FIG. 2

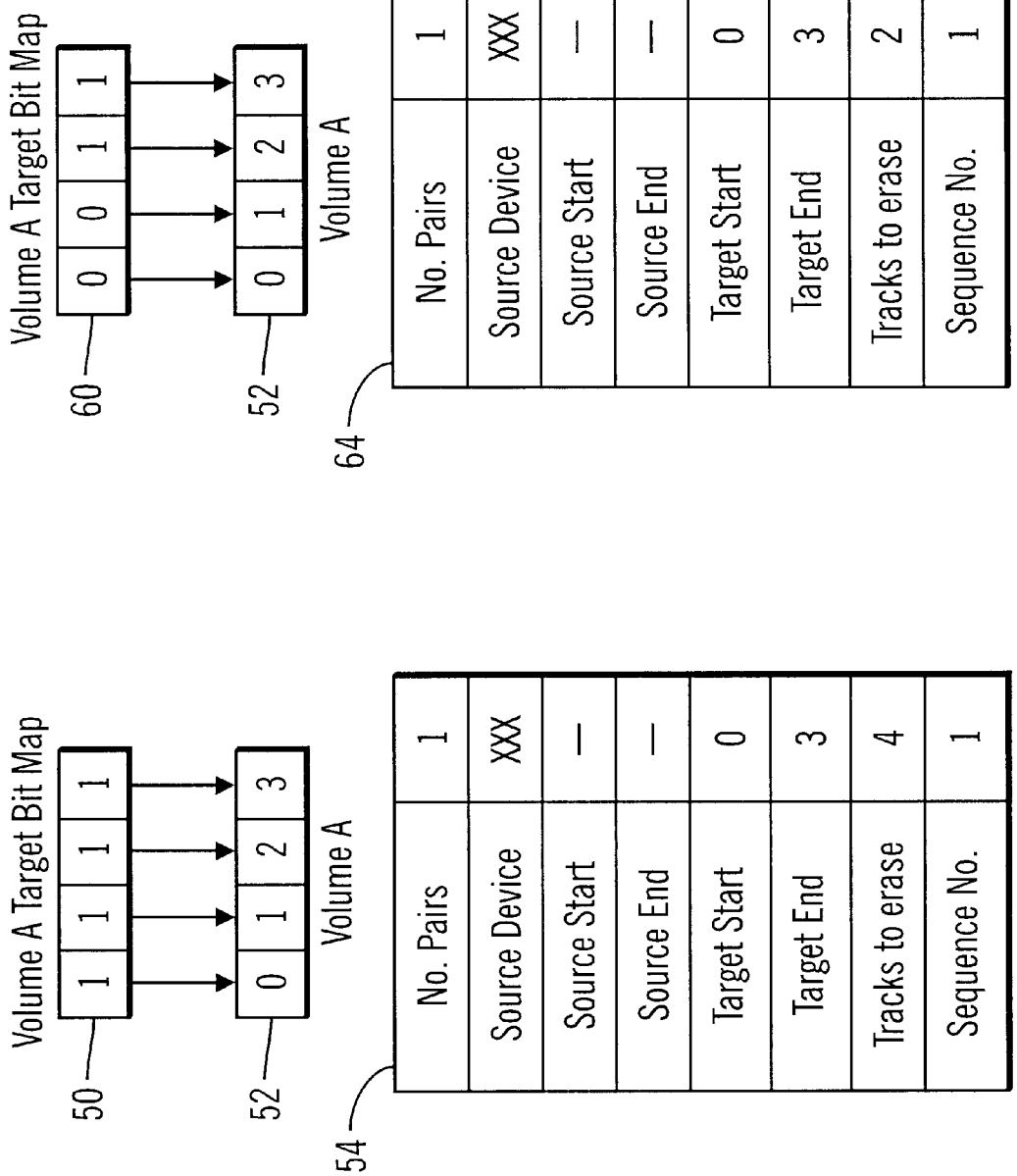

METHOD, SYSTEM, AND PROGRAM FOR LOGICALLY ERASING DATA

BACKGROUND OF THE INVENTION

1. Field of the Invention

A method, system, program, and memory for erasing data at storage locations and, in particular, logically erasing the data.

2. Description of the Related Art

To perform a secure erase of data, a write operation must be performed to each addressable storage location, such as the records in a track or fixed block, which contains data. This write operation involves writing meaningless data, such as all zeros or ones, over the addressable storage locations to prevent any future access to the data at such addressable locations. For instance, various utility programs allow the recovery of deleted files. The data in apparently deleted files can be recovered because the deletion of the file does not cause the erasure of the underlying data, but merely removes from the user's view the file object providing access to the underlying data. However, if a secure erase is performed, then the data cannot be subsequently recovered by such a utility program.

Performing a secure erase by writing data to the erased storage locations can take a substantial time and significantly degrade the performance of any applications seeking to access the storage device on which the secure erase is being performed. In fact, if a secure erase is performed on an entire volume of data, then the secure erase process can take from several minutes to a half-hour.

Certain systems, such as the IBM RAMAC Virtual Array or ICEBERG disk storage systems** provide for a virtual disk architecture, also referred to as Log Structured Array (LSA) system, in which mappings provide virtual locations of the data. LSA tables map host tracks to disk array storage locations where the data is stored. When data is written to the system, it is compressed and compacted, assembled into fixed blocks, and written to the DASD. All write operations in virtual disk architecture are always directed to a new place in the disk array. An erase operation in the LSA environment involves setting the pointers that provide the mapping from virtual to physical locations to zero and then freeing up the storage space that the pointers addressed. Any future attempt to access the erased track, or pointer to the track, would result in a determination that the pointer does not exist and must have been erased. The erase operation in LSA is substantially faster then secure erase operations that require I/Os to the storage device because the LSA erase just eliminates pointers maintained in a table in memory. However, the LSA erase is limited to the Virtual Disk Architecture, where tracks are logical tracks that map to different storage locations.

**ESA/390 is a trademark of IBM and RAMAC is a registered trademark of IBM; Iceberg is a registered trademark of Storage Technology Corporation.

There is thus a need in the art for an improved system for securely erasing data.

SUMMARY OF THE PREFERRED EMBODIMENTS

To overcome the limitations in the prior art described above, preferred embodiments disclose a method, system, program, and memory for erasing data. A request to erase data in at least one storage location is received. In response, a data structure is generated indicating that each storage location subject to the erase request is in an erased state.

Upon processing a request to access a storage location, a determination is made as to whether the requested storage location is indicated in the data structure. The data structure is processed to determine whether the requested storage location is in the erased state after determining that the requested storage location is indicated in the data structure. Access to the data at the requested storage location is denied after determining that the requested storage location is in the erased state.

The storage location may comprises a track, a CKD track, a fixed block address, or any other storage format known in the art.

In further embodiments, the data at one storage location indicated in the data structure is erased. In response, the data structure is modified to remove indication that the data at the storage location is in the erased state. The data at the requested storage location is returned after determining that the requested storage location is not in the erased state.

In still further embodiments, an update to one storage location is received. A determination is then made as to whether the storage location subject to the update is indicated in the data structure. If so, the data structure is processed to determine whether the storage location to update is in the erased state. The update is processed to update the data at the storage location. The data structure is modified to remove indication that the storage location is in the erased after determining that the storage location is in the erased state.

Preferred embodiments provide a data structure to logically erase data. If an application requests to access data at storage locations in an erased state, then the controller will prevent access to the data, even though the data remains at the storage location. The preferred system thus provides the security of a physical secure erase, as the application cannot access data in the logical erase state, without having to perform the disk input/output (I/O) operations to physically erase the data. Thus, the preferred logical erase provides security and at the same time has minimal impacts on system and application performance that typically accompanies a secure physical erase of large amounts of data.

BRIEF DESCRIPTION OF THE DRAWINGS

Referring now to the drawings in which like reference numbers represent corresponding parts throughout:

FIG. 2 illustrates a block diagram of a relationship table in accordance with preferred embodiments of the present invention;

FIGS. 3a,b illustrate block diagrams of data structures in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
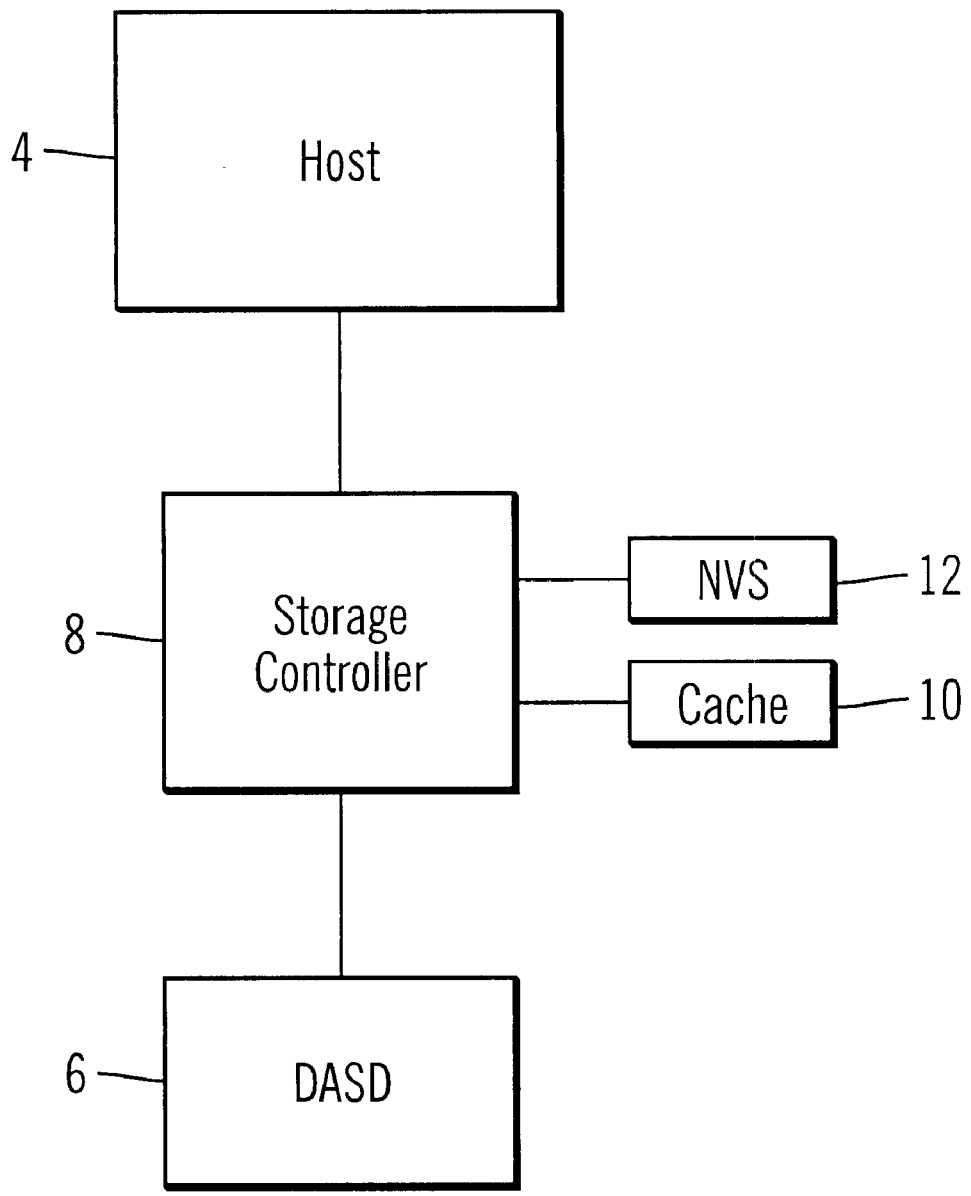
FIG. 1 is a block diagram illustrating a computing environment in which preferred embodiments of the present invention are implemented.

FIG. 1 illustrates a computing environment in which preferred embodiments are implemented. A host computer 4 performs data operations with respect to a DASD 6 via a storage controller 8 which manages access to the DASD 6. The storage controller 8 includes a cache 10. The storage controller 8 stages data from the DASD 6 into corresponding locations in the cache 10 that the host 4 requests. Similarly, data updates to tracks in the DASD 6 are stored in corresponding locations in the cache 10 until the data is destaged from cache 10 to DASD 6. The storage controller 8 may also copy any data updates written to cache 10 to a non-volatile storage unit (NVS) 12 to maintain for data recovery purposes. The NVS 12 is typically comprised of a battery backed-up volatile memory that can store the data updates for several hours in the event of a system failure.

The storage controller 8 may be comprised of the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent applications "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. patent Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. patent Ser. No. 09/168,017, which patent applications are incorporated herein by reference in their entirety.

The host 4 may be comprised of any type of computing device, such as a mainframe computer, that includes a computing architecture capable of communicating input/output (I/O) commands to the storage controller 8, such as the IBM ESA/390** System described in the IBM publication: "Enterprise Systems Architecture/390: ESCON I/O Interface," IBM document no. SA22-7202-02 (Copyright IBM Corp., 1990, 1991, 1992).

**ESA/390 is a trademark of IBM and RAMAC is a reistered trademark of IBM; Iceberg is a registered of Storage Technology Corporation.

The DASD 6 may store data in a Count-Key-Data (CKD) format or fixed block format, such as the SCSI format. In the CKD format, each track includes one or more data records that are each prefaced with CKD information. The CKD information provides the name and format of a record, the key length, and the data length. The key field, which is optional and unrelated to the index key used to provide logical ordering to the application program 8 records, is used for searching and may indicate the last data set in the record. The data field provides a variable length record of user data sets. The number of CKD records that can be placed on a track depends on the length of the data areas of the records. Physical locations on the DASD 6 are identified according to cylinder, track, and the record on the track, i.e., CCHHR, where CC indicates the cylinder, HH indicates the track, and R indicates the record on the track. With the CKD format, the storage controller addresses records in the DASD 6 using the CCHHR location identifier. Alternatively, the DASD 6 may store data in addressable fixed blocks of data. In yet further embodiments, the DASD 6 may store data in any addressable storage unit known in the art, including CKD and FBA.

Preferred embodiments may be implemented using either the CKD and/or FBA architecture in systems that update data in place. This means that any updates to data in the DASD 6 are written directly to the same position on the physical space of the DASD 6 where the data to update resides. Alternatively, in embodiments utilizing the FBA architecture in an LSA system, data is stored in a compressed format on the DASD 6 and updates to data are written at the end of the file or last data track. The original data that was the subject of the update is then invalidated. In a virtual array such as LSA, the DASD 6 appears to the host 4 as an IBM 3990 type system with volumes of data defined according to CCHH locations. These volumes that appear to the host 4 are referred to as functional devices. The storage controller 8 maintains tables to map the finctional devices or volumes the host 4 views to physical locations in the DASD 6. If data is updated, then that new updated data is stored at a new location in the DASD 6, and the storage controller 8 updates the tables to have the functional device point to the new location storing the updated data. In this way, the host 4 always references the data according to a CCHH location that remains unchanged. The storage controller 8 maintains tables to map the host 4 view to actual fixed blocks on the DASD 6.

Data Structures For Logical Erase

Preferred embodiments include various data structures the storage controller 8 creates when the host 4 initiates an erase operation with respect to tracks in the DASD 6. The preferred secure erase system may utilize the data structures described in the commonly assigned and copending patent application, "Method, System, And Program For Maintaining Electronic Data as of a Point-in-Time," to William K. Micka, David M. Shackelford, and Yoram Novick, having U.S. Ser. No. 09/347,344 and filed on Jul. 2, 1999, which application is incorporated herein by reference in its entirety.

The host system 4 would initiate an erase operation on an extent, i.e., consecutive range of tracks. The target tracks are referred to as the tracks subject to the erase operation. In response to this command, the storage controller 8 generates a target bit map data structure having bit map values that correspond to the tracks at the respective target physical locations in DASD 6 that are the subject of the erase operation. A bit map value of "on" or binary one indicates that the corresponding track is in an erased state, yet not physically erased.

The storage controller 8 further generates a relationship table for the target bit map that provides a mapping of the locations in the bit map to storage locations in the DASD 6 to be erased. FIG. 2 illustrates the fields in the target relationship table. The relationship table is used in conjunction with the bit map to determine the status of tracks to be erased. An extent number field 22 indicates the number of extent pairs in the table. An extent pair comprises each group of continuous tracks on which a logical condition exists, such as a copy or erase condition. Within a range of tracks subjected to an erase operation, there may be multiple extents of consecutive tracks at different source locations. An erase operation may result in multiple extents if the target tracks subject to erasure are located on different devices or logical volumes. The relationship table 20 maintains information in fields 24–34 for each extent pair indicated by the extent number 22. The device address 24 indicates the logical address of the physical storage for the corresponding source device. In a copy operation, the source device would indicate the source of the tracks to copy to the target tracks. However, in an erase operation there is no source of the data to substitute into the target tracks. Thus, a special code, e.g., XXX, is placed in the device address field 24 to indicate an erase operation.

In the erase operation, the source start 26 and end 28 fields are empty as there are no source tracks to copy over to the target locations. In the copending patent application entitled "Method, System, And Program For Maintaining Electronic Data as of a Point-in-Time," having U.S. Ser. No. 09/347, 344 and which was incorporated by reference above, the source start 26 and end 28 indicate the source tracks to copy to the target tracks. The number of tracks 30 indicates the number of contiguous protected tracks to erase from the target locations for that extent. Each bit map value, from the first to last, corresponds to the tracks to erase in the range of tracks between the target start and end. The tracks to erase field 36 indicates the number of tracks for each extent that have not been physically erased from the target locations. For copy operations, this field would indicate the number of tracks to copy from the source to target. The sequence number 38 is a time value indicating a time or sequence when the information for an extent pair, i.e., a set of fields 24–36, was generated into the relationship table with respect to previous extent pairs in the relationship table. The target relationship table 20 may include multiple extents indicating both copy operations and erase operations. In this way, the relationship table 20 is capable of maintaining information on multiple types of logical conditions or operations to be performed with respect to the storage locations.

One purpose of the bit map data structure and relationship table is to implement a logical erase that prevents host 4 applications from accessing the logically erased data without having to physically erase the data. Operations to overwrite data as part of an erase procedure can consume substantial system I/O resources and interfere with host 4 access to the data.

FIGS. 3a,b illustrate the results of erase related operations on the bit map and relationship table data structures. In the example of FIG. 3a, an erase operation is received from a host 4 application to erase tracks 0, 1, 2, and 3 in Volume A. In response to the erase command, the storage controller 8 creates a target bit map 50 having bit map values corresponding to each of the tracks to erase. A one or "on" value indicates that a physical erase operation has not yet been performed and that the track is to be protected or shielded from access requests, i.e., logically erased. The storage controller 8 would further generate the target 54 relationship table indicating the tracks that have not yet been erased, and the range of tracks to erase.

FIG. 3b illustrates the affect on the relationship table 54 of physically erasing tracks 0 and 1. After tracks 0 and 1 are physically erased, the bit map values 60 corresponding to tracks 0 and 1 are set to zero to indicate that the tracks have been physically erased or that access to the tracks is no longer blocked by the logical erase status. Further, the relationship table 54 is altered to 64 to reflect that only two tracks remain to physically erase in the tracks to erase field. After the tracks have been physically erased or otherwise overwritten during an update, then there is no longer a need to indicate the logical erasure of the tracks and read requests may be allowed to proceed to the physically erased tracks. However, if the physical erase of a track has not occurred, as indicated by a bit map value of one, then the storage controller 8 must prevent host access requests toward the logically erased data as the data in the logical erase state is still maintained on the track.

In the related application, "Method, System, And Program For Maintaining Electronic Data as of a Point-in-Time," having U.S. Ser. No. 09/347,344 and which was incorporated by reference above, a copy operation will generate a source bit map and relationship table indicating the source tracks of a copy operation and a target bit map and relationship table for the target tracks of the copy operation. If a copy operation was performed on tracks included within a range of target tracks that are subject to an erase relationship, then the target relationship table for the copy operation is modified to include the code in the source device address field 24 and set the source start 26 and end 28 to empty to indicate that the tracks include data subject to a logical erase. In this way the target bit map and relationship table of the copy operation are built to indicate that the target tracks are the subject of a logical erase operation.

Moreover, if the tracks that are subject to an erase operation are the target tracks of a previously initiated copy operation, then the erase operation would have to halt the copy operation by modifying the source bit map and relationship tables that included tracks to copy to the just erased tracks. The storage controller 8 may halt the copy operation by indicating in the bit map and relationship table that the copy operation with respect to the just erased tracks has completed.

Performing Logical Erase

Figure 4A:
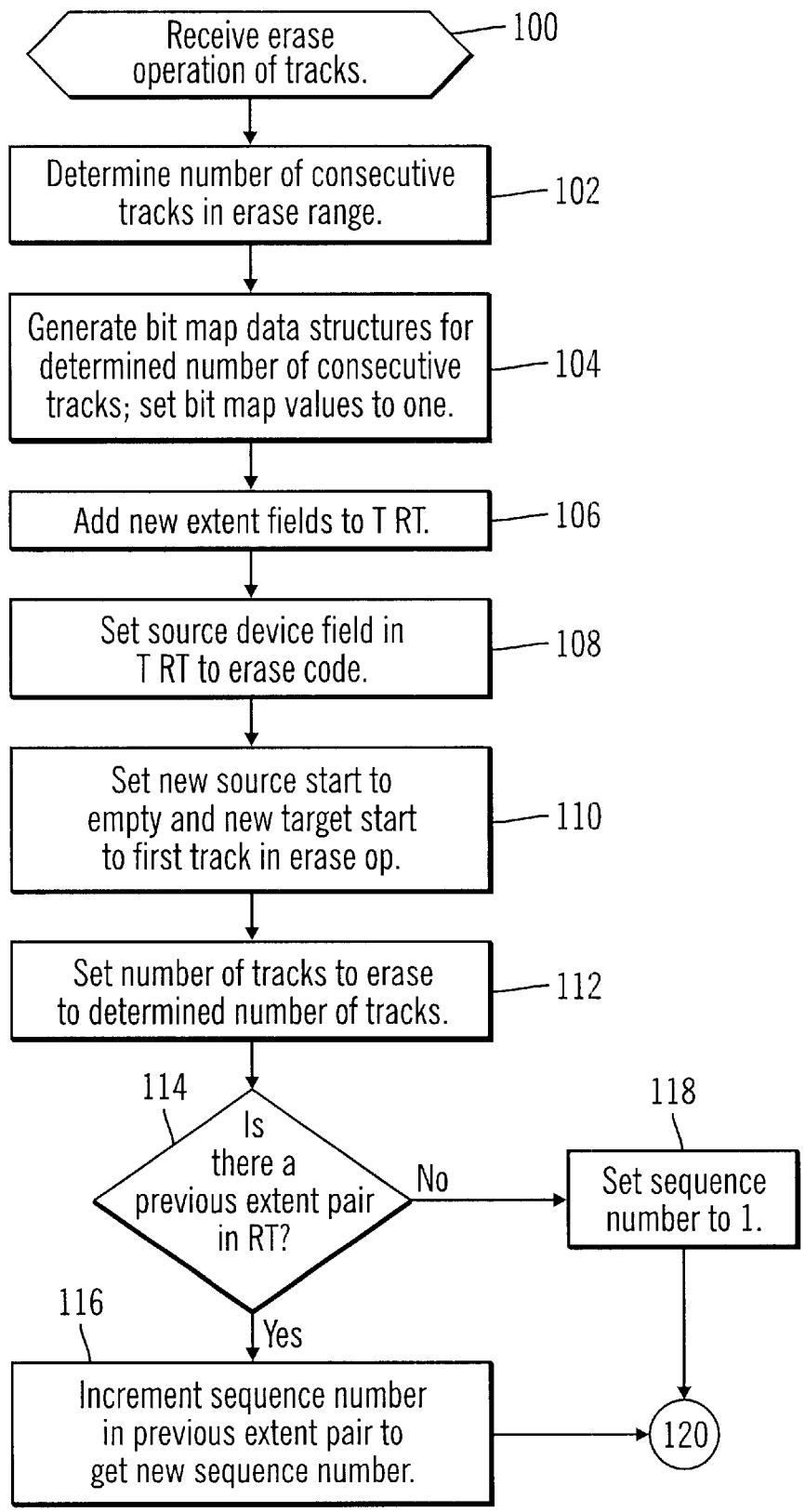
FIGS. 4a,b illustrate logic to logically erase data in accordance with preferred embodiments of the present invention.
Figure 4B:
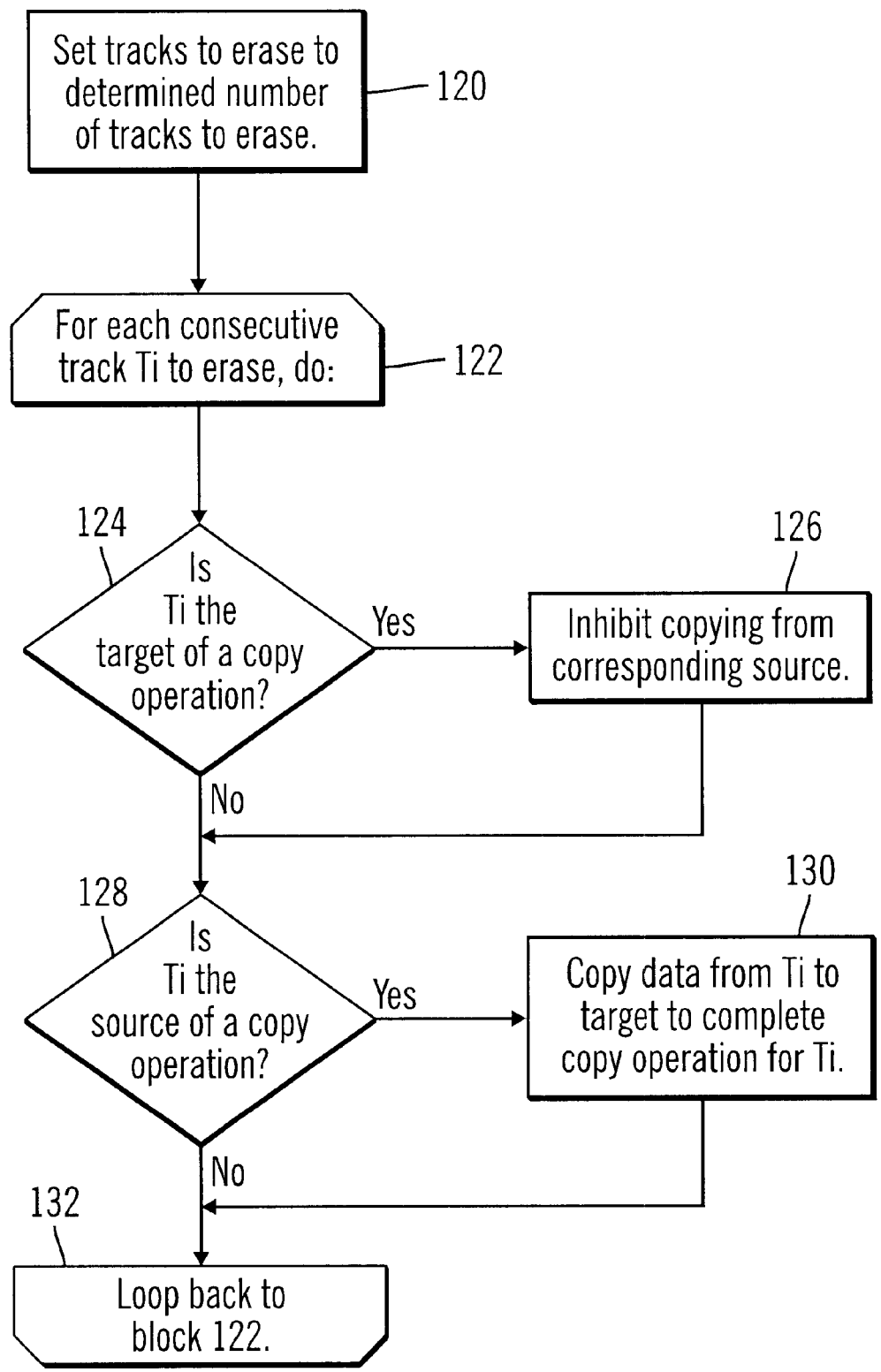

FIGS. 4a,b illustrate logic implemented in the storage controller 8 to build a logical erase relationship for target tracks that are the subject of an erase operation. Control begins at block 100 (FIG. 4a) with the storage controller 8 receiving an erase operation specifying a range of tracks to erase. The storage controller 8 determines (at block 102) the number of consecutive tracks from the first track in the erase range. The storage controller 8 then generates (at block 104) a bit map data structure for the determined number of consecutive track and sets the bit map values to one. Each bit map value corresponds to one of the consecutive tracks subject to an erase operation. The storage controller 8 then adds (at block 106) to the relationship table a new set of extent fields, fields 24–36 to include information on the logical erase operation. The source device field 24 in the target relationship table (T RT) is set (at block 108) to the erase code, the new source start 26 and end 28 are set (at block 110) to empty, and the target start 32 is set to the starting track subject to the erase. The number of tracks field 30 indicating the number of tracks in the range of tracks to erase is set (at block 112) to the determined number of tracks. The storage controller 8 then determines (at block 114) whether there is another set of extent fields, fields 24–36, in the target relationship table, indicating a previous erase and/or copy operation. If so, the storage controller 8 increments (at block 116) the sequence number 38 indicating the current number of sets of extent fields to obtain the new sequence number; otherwise, the sequence number is set (at block 118) to one. The storage controller 8, from block 116 or 118, then sets (at block 120) the tracks to erase field 36 to the determined number of tracks to erase.

Blocks 122–132 comprise a loop iterated to determine whether each track involved in an erase operation is also the source and/or target of a copy operation, such as the copy operation described in related patent application "Method, System, And Program For Maintaining Electronic Data as of a Point-in-Time," having U.S. Ser. No. 09/347,344 and which was incorporated by reference above. For each consecutive track Ti in the erase operation, the storage controller 8 first determines (at block 124) whether Ti is the target of a copy operation. This determination would be made by processing any data structures and relationship tables indicating whether track Ti is the target of a copy operation. If so, the storage controller 8 would inhibit (at block 126) any attempt to copy from the source to the target. The storage controller 8 could accomplish this by indicating in the bit map and relationship data structures of the source of the copy operation that the copy operation already occurred, thereby preventing the copying from occurring. From block 126 or after determining that Ti is not the target of a copy operation from the no branch 124, the storage controller 8 determines (at block 128) whether Ti is the source of a copy operation. If so, the storage controller 8 copies the data from Ti to the target track to complete the copy operation before logically erasing the data. The source and target track information would be determined from the source and target relationship tables. From block 130 or the end branch of block 128, the storage controller loops back (at lock 132) to block 122 to consider the next (i+1)th track, until all tracks subject to he erase condition are considered.

With the logic of FIGS. 4a, b, the storage controller 8 creates the relationship table for a particular volume or storage location to indicate that certain tracks are logically erased. The bit map data structures associated with the extent pairs in the relationship tables indicate the location of the logically erased tracks at the target storage location. The target storage locations for which relationship tables are maintained may be different logical volumes on the same DASD 8 or different sections within the same logical volume. The storage controller 8 may create and maintain the bit map and relationship table data structures in the NVS 12. In this way, if the system fails, then the location of logically erased data may be recovered from the NVS 12.

In preferred embodiments, when a relationship is established by setting the field values in the relationship table, any data for the target tracks subject to the logical erase operation that are maintained in cache 10 may be discarded.

Figure 5:
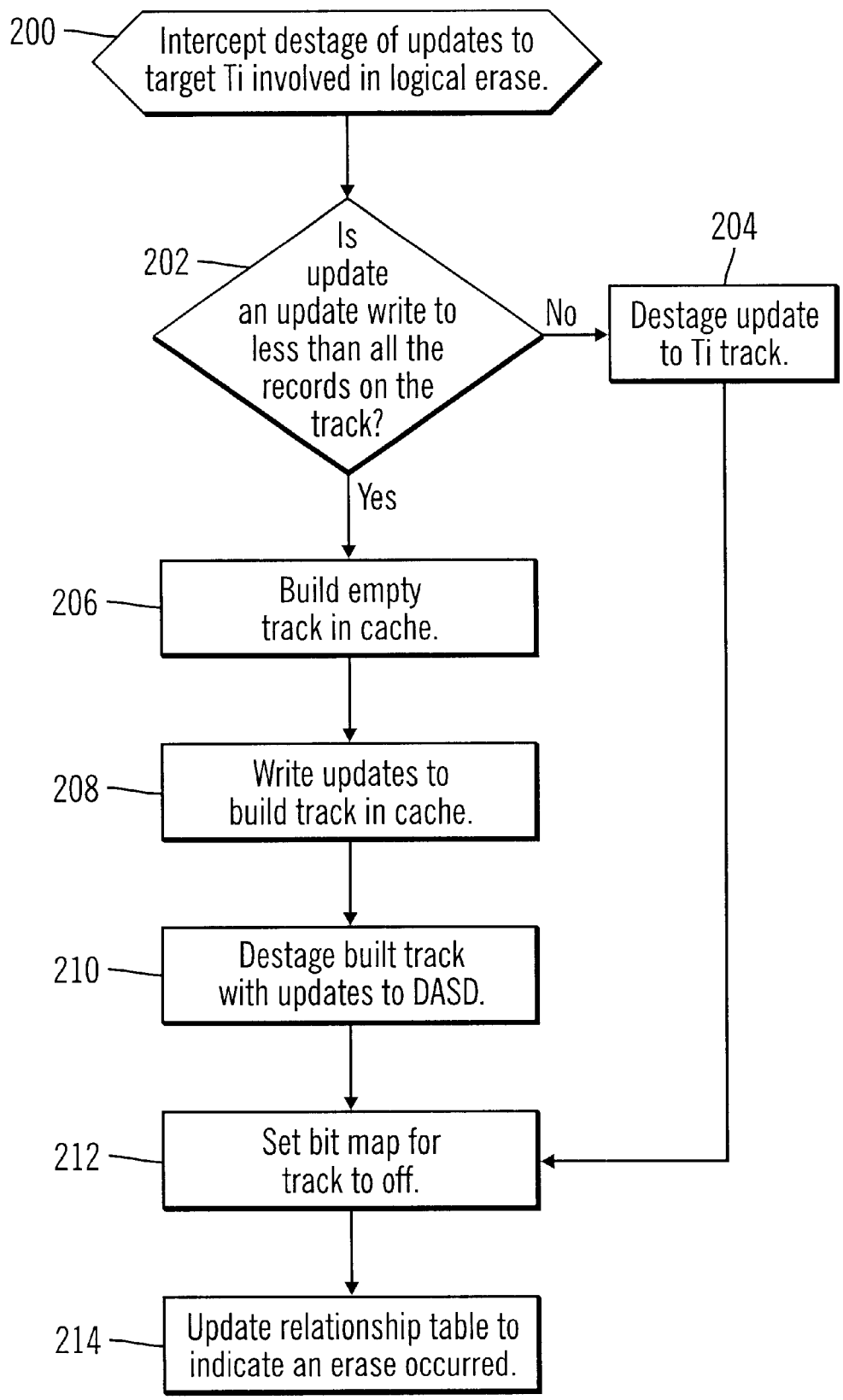
FIG. 5 illustrates logic to update logically erased data in accordance with preferred embodiments of the present invention.

FIG. 5 illustrates logic to handle a destage from cache to tracks that are subject to an erase operation. In preferred embodiments, updates to tracks are maintained in cache 10 until an algorithm, such as a least recently used algorithm, determines to destage data from cache 10. Thus, an update is written to the track location in cache 10 and is not written to the DASD 6 until the destage operation. For instance, if the storage controller 8 is operating in a DASD fast write (DFW) mode, then the storage controller 8 would store updates to the data in cache 10 and NVS 12, and destage updated data to DASD 6 at some later time.

The logic begins at block 200 when the storage controller 8 intercepts a destage of updates from cache 10 to DASD 6 to tracks that are in an erase state. The storage controller 8 would determine that tracks are in an erase state if there is a bit map value corresponding to one for the track, and the relationship table for that bit map value that is one indicates that the source device is the erase code. Such a situation occurs if the track has been the subject of an erase operation, but the data in the track has not been physically erased. In such case, the storage controller 8 determines (at block 202) whether the update is an update to less than all the records in the track. If not, the storage controller 8 proceeds (at block 204) with the update to the track in the DASD 6. If the update is to less than all the records on the track, then the update cannot be directly applied to the track as data at the non-updated parts of the track will not be overwritten. In such case, the storage controller 8 builds (at block 206) an empty track in cache 10 and then writes (at block 208) the updates to the locations in the built track. The storage controller 8 then destages (at block 210) the built track, including updates, to the DASD 6.

After destaging the data at block 210 or 204, the storage controller 8 sets (at block 212) the bit map value for the updated track to "off," or zero and updates (at block 214) the relationship table to indicate the data in the track was erased. In preferred embodiments, the storage controller 8 updates the relationship table by decreasing the number of tracks in the tracks to erase field 36. If all the tracks in the range of tracks represented by the extent in the relationship table have been erased, i.e., all bit map values are off, then the storage controller 8 would remove the extent fields, fields 24–36, for the erase operation from the relationship table and decrement the number of extent pairs field 22.

The logic of FIG. 5 is intended for situations where an update to a track subject to an erase condition, that has not yet been physically erased, updates less than all of the records in the track. If an update was a format write that involves an update to every record on the track or the entire track, then the storage controller 8 would perform the write operation (at block 204), and then indicate in the bit map data structure and relationship table that the erase of the track occurred.

Figure 6:
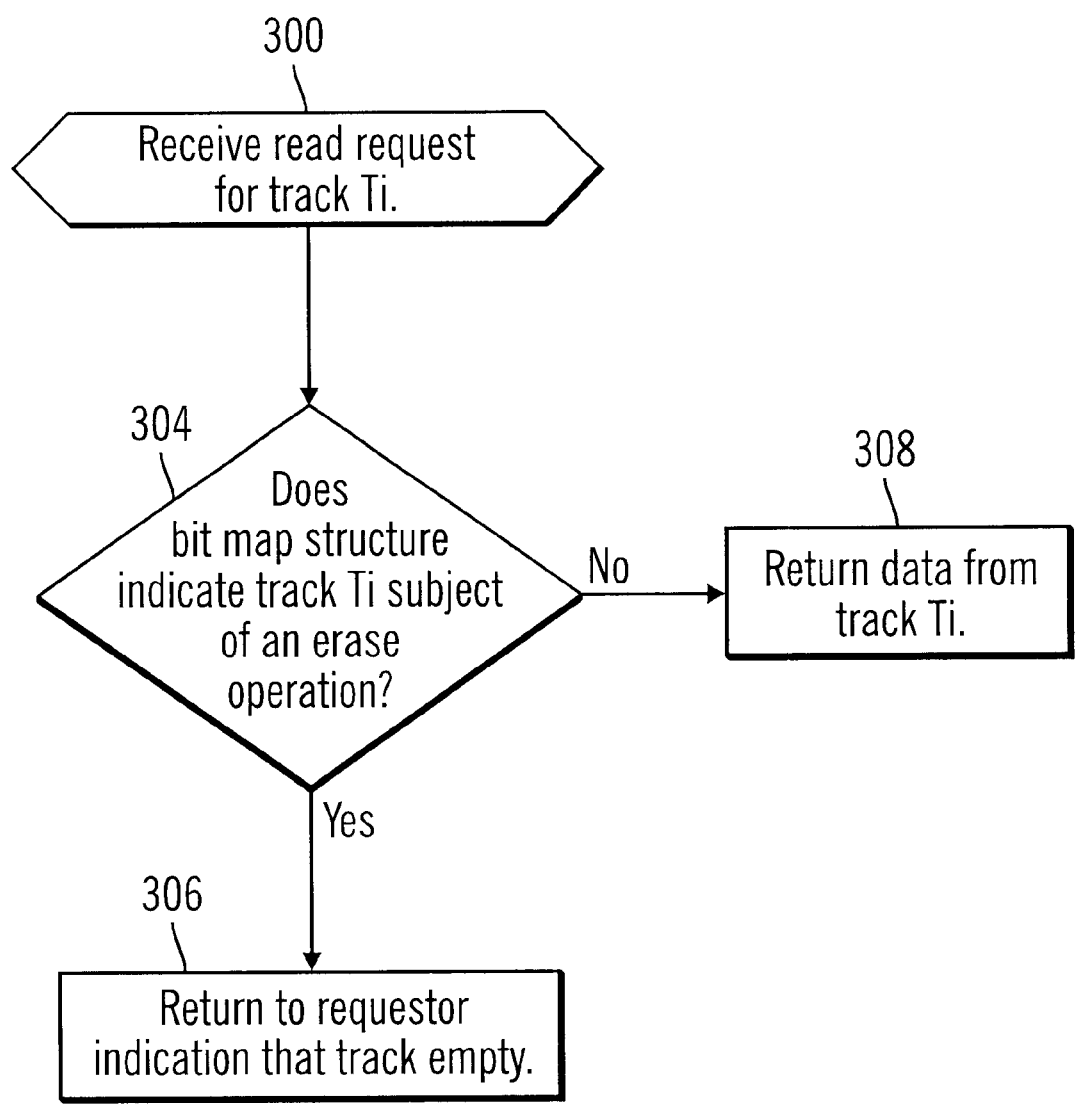
FIG. 6 illustrates logic to read logically erased data in accordance with preferred embodiments of the present invention.

FIG. 6 illustrates logic to process a read request to a track that is in an erase state. Control begins at block 300 when the storage controller 8 receives a request for track Ti. The storage controller 8 then processes (at block 304) the bit map data structures to determine whether there is a bit map value of "on" for the requested track. The storage controller 8 would further process the relationship table for that bit map data structure to determine whether the track corresponding to the bit map value is the subject of an erase operation. This can be determined by checking whether source device address 24 includes the erase code. If the track Ti is the subject of an erase operation, and has not been physically. erased or the data therein at the time of the erase operation destroyed, then the storage controller 8 returns (at block 306) an empty indicator to the requesting host 4 application. Otherwise, if the track Ti is not the subject of an erase operation or the data therein has been physically erased, then the requested data is returned (at block 308) to the host 4.

With the logic of FIG. 6, the storage controller 8 prevents a host 4 application from accessing erased data, that is logically erased as indicated in the bit map and relationship table data structures, but not yet physically erased.

In certain embodiments, the storage controller 8 may perform background erase operations to physically erase the tracks that are logically erased by writing over the data in the track with meaningless data. Upon physically erasing the data at the target track, the storage controller 8 would set the bit map value for the target track to "off," and decrement the tracks to erase field 36. Alternatively, with preferred embodiments, the storage controller 8 may not perform physical erase operations, and instead leave the logically erased data in the track until it has been written over during an update operation.

Preferred embodiments thus reduce burdens on processor cycles over methods that perform a physical erase because the storage controller 8 does not have to physically perform the I/Os to perform a secure erase operation and thereby delay receiving requests from host 4 applications. In this way, host 4 performance is not degraded by having to assign priority to erasing numerous tracks. Instead, with the preferred embodiments, the relationship tables indicate the location of logically erased data and ensure that such logically erased data will not be returned to any requesting host 4 application, even though the erased data remains on the track. The use of the preferred bit map data structures and relationship tables, thus, obviates the need to perform a physical erase operation to copy the data from the source to the target.

In further embodiments, if a bit map data structure contains all zero values, then the storage controller 8 may erase the target and source bit map data structure and the extent fields in the relationship tables for the logically erased data as the data has been physically erased, i.e., overwritten.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described as performing logical erase operations with respect to tracks of data. However, in alternative embodiments, the logical erase operation of the preferred embodiments may apply to any type of storage unit representing a storage structure storing data.

Preferred embodiments were described with respect to separate bit map and relationship table data structures for source and target locations involved in a point-in-time copy operation. However, in alternative embodiments the information maintained in the described bit map or relationship table data structures may be maintained in a different data structure format than that described herein.

Preferred embodiments may be implemented in update-in place systems in which updates are written to the previous location of the updated data. In case of an update, the point-in-time data is copied to the target location to allow the update to proceed at the source location. Alternatively, the preferred embodiments may apply to a virtual storage location, such as an LSA virtual array, where a table maps logical storage locations to actual physical locations. In such case the source and target locations comprise virtual arrays or pointers to physical locations. An update to the logically erased data would involve an update to a new location and modifying the source virtual array pointers to address the updated copy at the new location.

Preferred embodiments were described as implemented in a mainframe operating system, such as the IBM S/390 system, and the IBM 3990 Storage Controller where specific commands, such as control unit end, device end, etc., are involved when the storage controller attempts to erase data. However, those skilled in the art will appreciate that the data structures to logically erase data could apply to any data transfer interface known in the art, including SCSI, ST-506/ ST-412, IDE/ATA, Enhanced Small Device Interface (ESDI), floppy disk, parallel port, ATA, EIDE, ATA-2, Fast ATA, Ultra ATA, etc.

In summary, preferred embodiments disclose a method, system, program, and memory for erasing data. A request to erase data in at least one storage location is received. In response, a data structure is generated indicating that each storage location subject to the erase request is in an erased state. Upon processing a request to access a storage location, a determination is made as to whether the requested storage location is indicated in the data structure. The data structure is processed to determine whether the requested storage location is in the erased state after determining that the requested storage location is indicated in the data structure. Access to the data at the requested storage location is denied after determining that the requested storage location is in the erased state.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for erasing data, comprising:

receiving a request to erase data in at least one storage location;

generating a data structure, in response to processing the request, indicating that each storage location subject to the erase request is in an erased state;

processing a request to access a storage location;

determining whether the requested storage location is indicated in the data structure in response to processing the request to access the storage location;

processing the data structure to determine whether the requested storage location is in the erased state after determining that the requested storage location is indicated in the data structure; and denying access to the data at the requested storage location after determining that the requested storage location is in the erased state.

2. The method of claim 1, wherein the storage location is a member of the set of storage locations consisting of a track, a CKD track, and a fixed Lick address.

3. The method of claim 1, further comprising building a table in response to receiving the request to erase data at the storage location including information indicating a range of storage locations subject to the erase request and a code indicating that the range of storage locations are in the erased state.

4. The method of claim 3, further comprising:

indicating in the table a number of storage locations in the range of storage locations that have not been subject to a physical erase operation;

physically erasing all the data at one storage location; and decrementing the number of storage locations in the table indicating the number of storage locations that have not been subject to a physical erase operation in response to physically erasing all the data at one storage location.

5. The method of claim 1, wherein the request to erase data comprises a request to secure erase data to prevent any future access to the data in the at least one storage location when the request was received.

6. A method for erasing data, comprising:
receiving a request to erase data in at least one storage location;
generating a data structure, in response to processing the request, indicating that each storage location subject to the erase request is in an erased state;
physically erasing the data at one storage location indicated in the data structure;
modifying the data structure to remove indication that the data at the storage location is in the erased state after the data is erased;
processing a request to access a storage location;
determining whether the requested storage location is indicated in the data structure in response to processing the request to access the storage location;
processing the data structure to determine whether the requested storage location is in the erased state after determining that the requested storage location is indicated in the data structure;
denying access to the data at the requested storage location after determining that the requested storage location is in the erased state; and
returning the data at the requested storage location after determining that the requested storage location is not in the erased state.

7. A method for erasing data, comprising:
receiving a request to erase data in at least one storage location;
generating a data structure, in response to processing the request, indicating that each storage location subject to the erase request is in an erased state;
processing a request to access a storage location;
determining whether the requested storage location is indicated in the data structure in response to processing the request to access the storage location;
processing the data structure to determine whether the requested storage location is in the erased state after determining that the requested storage location is indicated in the data structure;
denying access to the data at the requested storage location after determining that the requested storage location is in the erased state;
receiving an update to one storage location;
determining whether the storage location subject to the update is indicated in the data structure:
processing the data structure to determine whether the storage location to update is in the erased state after determining that the storage location to update is indicated in the data structure;
processing the update to update the data at the storage location; and
modifying the data structure to remove indication that the storage location is in the erased state after determining that the storage location is in the erased state.

8. The method of claim 7, wherein the storage location includes multiple addressable locations, wherein processing the update further comprises:

determining whether the update is to update data at less than all the addressable location at the storage location;
writing the update to the addressable locations and overwriting all addressable locations of the storage location that are not subject to the update after determining that the update is to less than all the addressable locations, thereby overwriting all addressable locations at the updated storage location; and
indicating in the data structure that the storage location is not in the erased state.

9. A method for erasing data, comprising:
receiving a request to erase data in at least one storage location;
generating a data structure, in response to processing the request, indicating that each storage location subject to the erase request is in an erased state;
building a table in response to receiving the request to erase data at the storage location including information indicating a range of storage locations subject to the erase request and a code indicating that the range of storage locations are in the erased state, wherein the table is further capable of indicating that storage locations represented in the data structure are subject to a copy operation;
processing a request to access a storage location;
determining whether the requested storage location is indicated in the data structure in response to processing the request to access the storage location;
processing the data structure to determine whether the requested storage location is in the erased state after determining that the requested storage location is indicated in the data structure; and
denying access to the data at the requested storage location after determining that the requested storage location is in the erased state.

10. The method of claim 9, further comprising:
determining whether the table indicates that the storage location subject to the erase request is subject to a copy operation; and
modifying the table to inhibit the copying of data to the storage location subject to the erase operation after receiving the request to erase the storage location.

11. A system for maintaining electronic data at a point in time, comprising: a processing unit;
a storage device including addressable storage locations accessible to the processing unit; and
program logic executed by the processing unit, comprising:
(i) means for receiving a request to erase data in at least one storage location;
(ii) means for generating a data structure, in response to processing the request, indicating that each storage location subject to the erase request is in an erased state;
(iii) means for processing a request to access a storage location;
(iv) means for determining whether the requested storage location is indicated in the data structure in response to processing the request to access the storage location;
(v) means for processing the data structure to determine whether the requested storage location is in the erased state after determining that the requested storage location is indicated in the data structure; and
(vi) means for denying access to the data at the requested storage location after determining that the requested storage location is in the erased state.

12. The system of claim 11, wherein the storage location comprises one of a storage location that is a member of the set of storage locations consisting of a track, a CKD track, and a fixed block address.

13. The system of claim 11, wherein the program logic further comprises building a table in response to receiving the request to erase data at the storage location including information indicating a range of storage locations subject to the erase request and a code indicating that the range of storage locations are in the erased state.

14. The system of claim 13, wherein the program logic further comprises:
- means for indicating in the table a number of storage locations in the range of storage locations that have not been subject to a physical erase operation;
- means for physically erasing all the data at one storage location; and
- means for decrementing the number of storage locations in the table indicating the number of storage locations that have not been subject to a physical erase operation in response to physically erasing all the data at one storage location.

15. The system of claim 11, wherein the request to erase data comprises a request to secure erase data to prevent any future access to the data in the at least one storage location when the request was received.

16. A system for maintaining electronic data at a point in time, comprising:
- a processing unit;
- a storage device including addressable storage locations accessible to the processing unit; and
- program logic executed by the processing unit, comprising:
  - (i) means for receiving a request to erase data in at least one storage location;
  - (ii) means for generating a data structure, in response to processing the request, indicating that each storage location subject to the erase request is in an erased state;
  - (iii) means for physically erasing the data at one storage location indicated in the data structure;
  - (iv) means for modifying the data structure to remove indication that the data at the storage location is in te erased state after the data is erased;
  - (v) means for processing a request to access a storage location;
  - (vi) means for determining whether the requested storage location is indicated in the data structure in response to processing the request to access the storage location;
  - (vii) means for processing the data structure to determine whether the requested storage location is in the erased state after determining that the requested storage location is indicated in the data structure;
  - (viii) means for denying access to the data at the requested storage location after determining that the requested storage location is in the erased state; and
  - (ix) means for returning the data at the requested storage location after determining that the requested storage location is not in the erased state.

17. A system for maintaining electronic data at a point in time, comprising:
- a processing unit;
- a storage device including addressable storage locations accessible to the processing unit; and
- program logic executed by the processing unit, comprising:
  - (i) means for receiving a request to erase data in at least one storage location;
  - (ii) means for generating a data structure, in response to processing the request, indicating that each storage location subject to the erase request is in an erased state;
  - (iii) means for processing a request to access a storage location;
  - (iv) means for deetermining whether the requested storage location is indicated in the data structure in response to processing the request to access the storage location;
  - (v) means for processing the data structure to determine whether the requested storage location is in the erased state after determining that the requested storage location is indicated in the data structure;
  - (vi) means for denying access to the data at the requested storage location after determining that the requested storage location is in the erased state;
  - (vii) means for receiving an update to one storage location;
  - (viii) means for determining whether the storage location subject to the update is indicated in the data structure;
  - (ix) means for processing the data structure to determine whether the storage location to update is in the erased state after determining that the storage location to update is indicated in the data structure;
  - (x) means for processing the update to update the data at the storage location; and
  - (xi) means for modifying the data structure to remove indication that the storage location is in the erased after determining that the storage location is in the erased state.

18. The system of claim 17, wherein the storage location comprises multiple addressable locations, wherein the program logic for processing the update further comprises:
- means for determining whether the update is to update data at less than all the addressable location at the storage location;
- means for writing the update to the addressable locations and overwriting all addressable locations of the storage location that are not subject to the update after determining that the update is to less than all the addressable locations, thereby overwriting all addressable locations at the updated storage location; and
- means for indicating in the data structure that the storage location is not in the erased state.

19. A system for maintaining electronic data at a point in time, comprising
- a processing unit;
- a storage device including addressable storage locations accessible to the processing unit; and
- program logic executed by the processing unit, comprising:
  - (i) means for receiving a request to erase data in at least one storage location;
  - (ii) means for generating a data structure, in response to processing the request, indicating that each storage location subject to the erase request is in an erased state;
  - (iii) building a table in response to receiving the request to erase data at the storage location including information indicating a range of storage locations subject to the erase request and a code indicating that the range of storage locations are in the erased state wherein the table is further capable of indicating that storage locations represented in the data structure are subject to a copy operation (iv) means for processing a request to access a storage location;

(v) means for determining whether the requested storage location is indicated in the data structure in response to processing the request to access the storage location;

(vi) means for processing the data structure to determine whether the requested storage location is in the erased state after determining that the requested storage location is indicated in the data structure;

(vii) means for denying access to the data at the requested storage location after determining that the requested storage location is in the erased state.

20. The system of claim 19, wherein the program logic further comprises:

means for determining whether the table indicates that the storage location subject to the erase request is subject to a copy operation; and means for modifying the table to inhibit the copying of data to the storage location subject to the erase operation after receiving the request to erase the storage location.

21. An article of manufacture for erasing data in storage locations, the article of manufacture comprising computer readable storage media including at least one computer program embedded therein that is capable of causing a computer to perform;

receiving a request to erase data in at least one storage location;

generating a data structure, in response to processing the erase request, indicating that each storage location subject to the erase request is in an erased state;

physically erasing the data at one storage location indicated in the data structure;

modifying the data structure to remove indication that the data at the storage location is in the erased state after the data is erased;

processing a request to access a storage location;

determining whether the requested storage location is indicated in the data structure in response to processing the request to access the storage location;

processing the data structure to determine whether the requested storage location is in the erased state after determining that the requested storage location is indicated in the data structure;

denying access to the data at the requested storage location after determining that the requested storage location is in the erased state; and returning the data at the requested storage location after determining that the requested storage location is not in the erased state.

22. The article of manufacture of claim 21, further causing the computer to perform:

physically erasing the data at one storage location indicated in the data structure;

modifying the data structure to remove indication that the data at the storage location is in the erased state after the data is erased; and returning the data at the requested storage location after determining that the requested storage location is not in the erased state.

23. The article of manufacture of claim 21, further causing the computer to perform building a table in response to receiving the request to erase data at the storage location including information indicating a range of storage locations subject to the erase request and a code indicating that the range of storage locations are in the erased state.

24. The article of manufacture of claim 23, further causing the computer to perform:

indicating in the table a number of storage locations in the range of storage locations that have not been subject to a physical erase operation;

physically erasing all the data at one storage location; and decrementing the number of storage locations in the table indicating the number of storage locations that have not been subject to a physical erase operation in response to physically erasing all the data at one storage location.

25. The article of manufacture of claim 24, further causing the computer to perform:

determining whether the table indicates that the storage location subject to the erase request is subject to a copy operation; and modifying the table to inhibit the copying of data to the storage location subject to the erase operation after receiving the request to erase the storage location.

26. The article of manufacture of claim 21, wherein the request to erase data comprises a request to secure erase data to prevent any future access to the data in the at least one storage location when the request was received.

27. An article of manufacture for erasing data in storage locations, the article of manufacture comprising computer readable storage media including at least one computer program embedded therein that is capable of causing a computer to perform:

receiving a request to erase data in at least one storage location;

generating a data structure, in response to processing the erase request, indicating that each storage location subject to the erase request is in an erased state;

processing a request to access a storage location;

determining whether the requested storage location is indicated in the data structure in response to processing the request to access the storage location, processing the data structure to determine whether the requested storage location is in the erased state after determining that the requested storage location is indicated in the data structure;

denying access to the data at the requested storage location after determining that the requested storage location is in the erased state;

receiving an update to one storage location;

determining whether the storage location subject to the update is indicated in the data structure;

processing the data structure to determine whether the storage location to update is in the erased state after determining that the storage location to update is indicated in the data structure;

processing the update to update the data at the storage location; and modifying the data structure to remove indication that the storage location is in the erased after determining that the storage location is in the erased state.

28. The article of manufacture of claim 27, wherein the storage location includes multiple addressable locations, wherein processing the update further comprises causing the computer to perform:

determining whether the update is to update data at less than all the addressable location at the storage location;

writing the update to the addressable locations and overwriting all addressable locations of the storage location that are not subject to the update after determining that the update is to less than all the addressable locations, thereby overwriting all addressable locations at the updated storage location; and indicating in the data structure that the storage location is not in the erased state.

29. An article of manufacture for erasing data in storage locations, the article of manufacture comprising computer readable storage media including at least one computer program embedded therein that is capable of causing a computer to perform:

receiving a request to erase data in at least one storage location;

generating a data structure, in response to processing the erase request, indicating that each storage location subject to the erase request is in an erased state;

building a table in response to receiving the request to erase data at the storage location including information indicating a range of storage locations subject to the erase request and a code indicating that the range of storage locations are in the erased state, wherein the table is further capable of indicating that storage locations represented in the data structure are subject to a copy operation:

processing a request to access a storage location;

determining whether the requested storage location is indicated in the data structure in response to processing the request to access the storage location;

processing the data structure to determine whether the requested storage location is in the erased state after determining that the requested storage location is indicated in the data structure; and denying access to the data at the requested storage location after determining that the requested storage location is in the erased state.

30. A memory device for erasing data, comprising a data structure generated in response to a request to erase data in at least one storage location, wherein the data structure indicates each storage location in an erased state, wherein the data structure is processed in response to a request to access the storage location, and wherein access to the storage location in the erased state is denied.

31. The memory device of claim 30, further comprising a table built in response to receiving the request to erase data at the storage location, wherein the table includes information indicating a range of storage locations subject to the erase request and a code indicating that the range of storage locations are in the erased state.

32. The memory device of claim 30, wherein the request to erase data comprises a request to secure erase data to prevent any future access to the data in the at least one storage location when the request was received.

33. A memory device for erasing data, comprising a data structure generated in response to a request to erase data in at least one storage location, wherein the data structure indicates each storage location in an erased state, wherein the data structure is modified to remove the indication that the data at the storage location is in the erased state in response to physically erasing the data at the storage location, wherein the data structure is processed in response to a request to access the storage location, wherein access to the storage location in the erased state is denied, and wherein data is returned from the storage location after determining that the requested storage location is not in the erased state.

34. A memory device for erasing data, comprising:

a data structure generated in response to a request to erase data in at least one storage location, wherein the data structure indicates each storage location in an erased state, wherein the data structure is processed in response to a request to access the storage location, and wherein access to the storage location in the erased state is denied; and a table built in response to receiving the request to erase data at the storage location, wherein the table includes information indicating a range of storage locations subject to the erase request and a code indicating that the range of storage locations are in the erased state, wherein the table is further capable of indicating that storage locations represented in the data structure are subject to a copy operation.

35. The memory device of claim 34, wherein the table is modified to inhibit the copying of data to the storage location subject to the erase operation after receiving the request to erase the storage location.

* * * * *

UNITED STATES PATENT AND TRADEMARK OFFICE
CERTIFICATE OF CORRECTION

PATENT NO. : 6,564,307 B1
DATED : May 13, 2003
INVENTOR(S) : William Frank Micka and David Michael Shackelford It is certified that error appears in the above-identified patent and that said Letters Patent is hereby corrected as shown below:

Column 10,
Line 54, delete "Lick" and insert -- block --.

Column 13,
Line 43, delete "te" and insert -- the --.

Column 14,
Line 9, delete "deetermining" and insert -- determining --.

Signed and Sealed this

Third Day of May, 2005

JON W. DUDAS
*Director of the United States Patent and Trademark Office*